x`# United States Patent

Aguilera et al.

(10) Patent No.: US 8,726,129 B1
(45) Date of Patent: May 13, 2014

(54) METHODS OF WRITING AND RECOVERING ERASURE CODED DATA

(75) Inventors: Marcos Kawazoe Aguilera, Palo Alto, CA (US); Ramaprabhu Janakiraman, St. Louis, MO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2222 days.

(21) Appl. No.: 10/898,139

(22) Filed: Jul. 23, 2004

(51) Int. Cl.
*G11C 29/00* (2006.01)
*G06F 13/00* (2006.01)

(52) U.S. Cl.
USPC .......................... 714/770; 711/114; 719/325

(58) Field of Classification Search
USPC ................ 714/6, 7, 770; 711/114; 719/325
See application file for complete search history.

(56) References Cited

U.S. PATENT DOCUMENTS

| | | | | |
|---|---|---|---|---|
| 4,761,785 A | * | 8/1988 | Clark et al. | 714/805 |
| 5,134,619 A | * | 7/1992 | Henson et al. | 714/770 |
| 5,140,592 A | * | 8/1992 | Idleman et al. | 714/5 |
| 5,201,044 A | * | 4/1993 | Frey et al. | 714/20 |
| 5,274,645 A | * | 12/1993 | Idleman et al. | 714/6 |
| 5,285,451 A | * | 2/1994 | Henson et al. | 714/6 |
| 5,497,457 A | * | 3/1996 | Ford | 714/6 |
| 5,574,882 A | * | 11/1996 | Menon et al. | 711/114 |
| 5,596,709 A | * | 1/1997 | Bond et al. | 714/7 |
| 5,708,668 A | * | 1/1998 | Styczinski | 714/6 |
| 5,787,460 A | * | 7/1998 | Yashiro et al. | 711/114 |
| 5,867,640 A | * | 2/1999 | Aguilar et al. | 714/6 |
| 5,954,822 A | * | 9/1999 | Yashiro et al. | 714/6 |
| 5,958,067 A | * | 9/1999 | Kaneda et al. | 714/6 |
| 5,960,169 A | * | 9/1999 | Styczinski | 714/6 |
| 6,272,662 B1 | * | 8/2001 | Jadav et al. | 714/805 |
| 6,446,237 B1 | * | 9/2002 | Menon | 714/800 |
| 6,748,488 B2 | * | 6/2004 | Byrd et al. | 711/114 |
| 7,146,461 B1 | * | 12/2006 | Kiselev et al. | 711/114 |
| 2005/0091450 A1 | * | 4/2005 | Frolund et al. | 711/114 |

OTHER PUBLICATIONS

K. Amiri and G. A. Gibson and R. A. Golding, Highly concurrent shared storage, The 20th International Conference on Distributed Computing Systems (ICDCS 2000), Apr. 10-13, 2000, Taipei, Taiwan, pp. 298-307, IEEE Computer Society, Los Alamitos, CA, 2000.
H. Attiya, A. Bar-Noy, and D. Dolev, Sharing memory robustly in message-passing systems, Journal of the ACM, vol. 42, Issue 1, Jan. 1995, pp. 124-142, ACM Press, New York, NY, 1995.

(Continued)

*Primary Examiner* — Joseph D Torres

(57) ABSTRACT

An embodiment of a method of writing erasure coded data swaps a new data block for an old data block within a stripe of erasure coded data. The stripe of erasure coded data comprises data blocks and a redundancy block. The method computes a redundancy update parameter for the redundancy block using the new data block and the old data block. The method updates the redundancy block using the redundancy block, the redundancy update parameter, and a mathematical operator. An embodiment of a method of recovering erasure coded data obtains a lock on a subset of data blocks and one or more redundancy blocks. The method determines whether the subset of the data blocks and the one or more redundancy blocks includes sufficient blocks to restore the stripe. If not, the method relaxes the lock to allow at least one update of the one or more redundancy blocks while not allowing any writes of the data blocks. The method uses the subset to restore the stripe.

12 Claims, 9 Drawing Sheets

(56) References Cited

OTHER PUBLICATIONS

P. Dutta, S. Frolund, R. Guerraoui, and B. Pochon, An efficient universal construction for message-passing systems, EPFL Technical Report IC-TR-2000228, May 2002.

S. Frolund, A. Merchant, Y. Saito, S. Spence, and A. Veitch, FAB: Enterprise storage systems on a shoestring, 2003.

G. R. Goodson, J. J. Wylie, G. R Ganger, and M. K. Reiter, Decentralized storage consistency via versioning servers, Technical Report CMU-CS-02-180, School of Computer Science, Carnegie Mellon University, Pittsburg, PA, Sep. 2002.

J. Kubiatowicz, D. Bindel, Y. Chen, S. Czerwinskl, P. Eaton, D. Geels, R Gummadi, S. Rhea, H. Weatherspoon, W. Weimer, C. Wells, and B. Zhao, Oceanstore: An architecture for global-scale persistent storage, Proceedings of the Ninth International Conference on Architectural Support for Programming Languages and Operating Systems (ASPLOS-IX), Cambridge, MA, pp. 190-201, ACM Press, New York, NY, Nov. 2000.

L. Lamport, On interprocess communication, Dec. 25, 1985.

E. K. Lee and C. A. Thekkath, Petal: Distributed virtual disks, Proceedings of the Seventh International Conference on Architectural Support for Programming Languages and Operating Systems (ASPLOS-VII), Cambridge, MA, pp. 84-92, ACM Press, New York, NY, 1996.

N. A. Lynch and A. A. Shvartsman, Robust emulation of shared memory using dynamic quorum acknowledged broadcasts, Dec. 2, 1996.

N. A. Lynch and A. A. Shvartsman, Rambo: A reconfigurable atomic memory service for dynamic networks, Distributed Computing: 16th International Conference, DISC 2002, Toulouse, France, Oct. 28-30, 2002, Proceedings, pp. 173-190, Springer-Verlag Heidelberg, Heidelberg, Germany, 2002.

D. Malkhi and M. Reiter. Byzantine quorum systems, Oct. 16, 1998.

J. S. Plank, A tutorial on Reed-Solomon coding for fault-tolerance in RAID-like systems, Software: Practice and Experience, Sep. 1997, vol. 27, Issue 9, pp. 995-1012, John Wiley & Sons, Limited, Hoboken, NJ, 1997.

H. Weatherspoon and J. Kubiatowicz, Erasure coding vs.replication: A quantitative comparison, Proceedings for the 1st International Workshop on Peer-to-Peer Systems (IPTPS '02), Mar. 2002.

U.S. Appl. No. 10/693,573, filed Oct. 23, 2003, Frolund et al.
U.S. Appl. No. 10/693,743, filed Oct. 23, 2003, Frolund et al.
U.S. Appl. No. 10/693,758, filed Oct. 23, 2003, Frolund et al.

\* cited by examiner

500

Global variables:
    *data[i]* for $i = 1, \ldots, n$     { state from each disk }
    *seq*, initially 0     { for transaction id }

502

To *READ(i)* do     { $1 < i < k$ }
1    <v, lmode> ← $D_i$.read()
2    while $v = \perp$ do
3        if *lmode* ∈ {UNL, EXP} then *start_recovery()*
4        <v, lmode> ← $D_i$.read()
5    return *v*

504

To *WRITE(i, v)* do     { $1 < i < k$ }
6    repeat
7        *ntid* ← <*seq*, *i*, *p*>; *seq* ← *seq* + 1
8        <*sect*, *epoch*, *otid*, *lmode*> ← $D_i$.swap(*v*, *ntid*)
9        while *sect* = $\perp$ do
10          if *lmode* ∈ {UNL, EXP} then *start_recovery()*
11          <*sect*, *epoch*, *otid*, *lmode*> ← $D_i$.swap(*v*, *ntid*)
12        $M \leftarrow \{k+1, \ldots, n\}$     { Missing disks }
13        $S \leftarrow \{i\}$     { Successful disks }
14        while $M \neq \emptyset$ and $S \neq \emptyset$ do
15          for each $j \in M$ do
16              *r[j]* ← $D_j$.add( $\alpha_{ji}$.(*v* - *sect*), *ntid*, *otid*, *epoch*)
17              if *r[j].status* = OK then $S \leftarrow S \cup \{j\}$
18          if $\exists j \in M : r[j].lmode$ = EXP or
                  (*r[j].lmode* = UNL and *r[j].opmode* ≠ NORM) or
                  (*r[j].status* = ORDER and tired of looping)
19          then *start-recovery()*
20          if $\exists j \in M : r[j].status$ = ORDER then
21              pfor each $j \in S$ do
22                  *s[j]* ← $D_j$.checktid(*ntid*, *otid*)
23              if $\exists j \in S : s[j]$ = GC then *otid* ← $\perp$
24          $S \leftarrow S - \{j \in S : s[j]$ = INIT }
25          $M \leftarrow M - \{j \in M : (r[j].lmode$ = UNL and
                  *r[j].status* ≠ ORDER) or *r[j].opmode* = INIT }
26        for each $j \in S$ do *gc[j]* ← *gc[j]* ∪ {*ntid*}
27    until $S = \{i, k+1, \ldots, n\}$

FIG. 5A 500
506 task *collect_garbage*
28   repeat periodically while not executing *WRITE*
29      { *WRITES* are deferred within repeat body )
30      pfor $j \leftarrow 1 \ldots n$ do
31         repeat $r[j] \leftarrow D_j.gc\_old(old[j])$
32         until $r[j]$ = OK
33      pfor $j \leftarrow 1 \ldots n$ do
34         repeat $r[j] \leftarrow D_j.gc\_recent(gc[j])$
35         until $r[j]$ = OK
36         $old[j] \leftarrow gc[j]; gc[j] \leftarrow \emptyset$ procedure *start_recovery()*
37   if *recover* not yet running locally
38   then fork *recover()*              { if/then executed atomically )

procedure *recover()*
39   for $j \leftarrow 1 \ldots n$ do
40      $r[j] \leftarrow D_j.trylock(L1)$
41      if $r[j].status = \perp$ then
42         pfor each $l \leq j$ such that $r[l].status$ = OK do
43            $D_l.setlock(r[l].oldlmode)$
44         return
45   *recover_solo()* procedure *recover_solo()*
46   for $j \leftarrow 1 \ldots n$ do $data[j] \leftarrow D_j.getstate()$
47   if for some $h$, $data[h].opmode$ = RECONS then
48      $cset \leftarrow data[h].recons\_disks - \{ j : data[j].opmode$ = INIT)
49   else
50      $cset \leftarrow find\text{-}consistent()$
51      $slack \leftarrow t_d - |\{j : data[j].opmode$ = INIT$\}|$
52   while $|cset| < k + slack$ do
53      pfor $j \leftarrow k + 1 \ldots n$ do $D_j.setlock(L0)$
54      while $|cset| < k + slack$ do
55         pfor $j \leftarrow k + 1 \ldots n$ do $data[j] \leftarrow D_j.get\_state()$
56         $cset \leftarrow find\text{-}consistent()$
57         $slack \leftarrow t_d - |\{j : data[j].opmode$ = INIT$\}|$
58      { try to lock disks before recent list changes }
59      pfor $j \leftarrow k + 1 \ldots n$ do $list[j] \leftarrow D_j.getrecent(L1)$
60      $cset \leftarrow cset - \{ j : list[j] \neq data[j].recentlist \}$
61   pfor $j \leftarrow 1 \ldots n$ do $D_j.set\_reconstruct(cset)$
62   *reconstruct(cset)*

FIG. 5B procedure *reconstruct(cset)*
63  { non-failed disks have *lmode* = L1 and *opmode* = RECONS
64   and *data[j].sector* has data for all disks $j \in cset$ )
65  *sectors* ← *erasure_decode(data[*].sector, cset)*
66  pfor each $j \in \{1, \ldots, n\}$ - *cset* do $D_j.write(sectors[j])$
67  pfor $j \leftarrow 1 \ldots n$ do $epoch[j] \leftarrow D_j.get\_epoch()$
68  pfor $j \leftarrow 1 \ldots n$ do $D_j.set\_epoch(\max_a\{epoch[a]\} + 1)$
69  pfor $j \leftarrow 1 \ldots n$ do $D_j.clean\_lists()$
70  pfor $j \leftarrow 1 \ldots n$ do $D_j.try\_set\_opmode(\text{RECONS, NORM})$
71  pfor $j \leftarrow 1 \ldots n$ do $D_j.setlock(\text{UNL})$ function *find_consistent()*
  return a maximal set $S$ such that
    (1) $\forall i \in S : data[i].opmode = \text{NORM}$,
    (2) $\forall$ redundant disks $r, s \in S : fs(r) = fs(s)$, and
    (3) $\forall$ redundant disks $r \in S$, $\forall$ data disks $j \in S : H_S(r, j) = fs(j)$
      where $H_S(i, j) = \{x \in fs(i) \text{ such that } x = <*, j, *> \}$,
      $fs(i) := tids(data[i].recentlist) - G_S$,
      $G_S := \cup_{i \in S} \, tids(data[i].oldlist)$,
    *tids(list)* is the set of *tid's* of items in *list*.

FIG. 5C

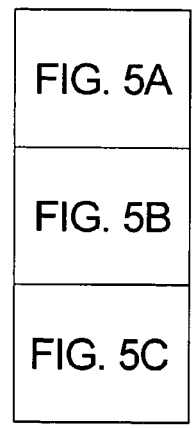

Global variables:
    *sector*                                                        { data stored in disk }
    *opmode* $\in$ {NORM, RECONS, INIT}     { operation mode }
    *lmode* $\in$ {UNL, L0, L1, EXP}          { locking mode }
    *lid* $\in \Pi$                                            { identity of locking process }
        { if *lmode* $\in$ {L0, L1} and process *lid* crashes }
        { then *lmode* automatically changes to EXP }
    *epoch* $\in$ N x N                        { incarnation, seq pair }
    *time*                { local time, auto incremented at some rate }
    *recons_disks* $\in$ set of disk numbers
    *recentlist* $\in$ set of <*tid, time*>     { recent write list }
    *oldlist* $\in$ set of <*tid, time*>        { old write list }

Initial state:
    <*opmode, lmode, sector, time*> : <NORM, UNL, 0, 0>
    <*epoch, recons_disks, recentlist, oldlist*> : <0, $\emptyset$, $\emptyset$, $\emptyset$>

State after failure:
    <*opmode, lmode, time*> : <INIT, UNL, 0>
    (*epoch, recons_disks, recentlist, oldlist*) : <0, $\emptyset$, $\emptyset$, $\emptyset$>

602 operation *read( )*
    if *opmode* $\neq$ NORM or *lmode* $\neq$ UNL
    then return <*sector* : $\perp$, *lmode*>
    else return <*sector* : *sector*, *lmode*> operation *swap(v, ntid)*
    if *opmode* $\neq$ NORM or *lmode* $\neq$ UNL
    then return <*sector* : $\perp$, *epoch*, $\perp$, *lmode*>
    *retsect* $\leftarrow$ *sector*
    *sector* $\leftarrow$ *v*
    if *recentlist* = $\emptyset$ then *otid* $\leftarrow \perp$
    else *otid* $\leftarrow$ tid in *recentlist* with largest *time*
    *recentlist* $\leftarrow$ *recentlist* $\cup$ {<*ntid, time*>}
    return <*sector* : *retsect*, *epoch*, *otid*, *lmode*>

FIG. 6A

600 function *tids(tidtime_list)*
    return *tid* of entries in *tidtime_list* operation *add(v, ntid, otid, e)*
    if *opmode* ≠ *NORM* or *lmode* ∉ {UNL, L0} or *e* < *epoch*
    then return *(status* : ⊥, *opmode, lmode)*
    if *otid* ≠ ⊥ and *otid* ∉ *tids(recentlist* ∪ *oldlist)*
    then return *(status* : ORDER, *opmode, lmode)*
    *sector* ← *sector* + *v*
    *recentlist* ← *recentlist* ∪ *{(ntid, time))*
    return *(status* : OK, *opmode, lmode)* operation *checktid(ntid, otid)*
    if *ntid* ∉ *tids(recentlist)* then return INIT
    else if *otid* ∉ *tids(recentlist)* then return GC
    else return NOCHANGE operation *gc_old(list)*
    if *opmode* ≠ NORM or *lmode* ≠ UNL then return ⊥
    remove entries in *oldlist* with *tid* in *list*
    return OK operation *gc_recent(list)*
    if *opmode* ≠ NORM or *lmode* ≠ UNL then return ⊥
    for each *t* ∈ *list* do
        if exists entry in *recentlist* with *tid t* then
            remove entry from *recentlist*
            add entry to *oldlist*
    return OK operation *trylock(lm)*
    if *lmode* ∈ {L0, L1} then return *(status* : ⊥, *lmode)*
    *oldlmode* ← *lmode*
    <*lmode, lid*> ← <*lm, caller*>
    return <*status* : OK, *oldmode*> operation *setlock(lm)*
    <*lmode, lid*> ← <*lm, caller*>

FIG. 6B

600 operation *getstate()*
    if *opmode* = NORM then *sect* ← *sector* else *sect* ← ⊥
    return *(opmode, recons_disks, oldlist, recentlist, sect)* operation *getrecent(lm)*
    <*lmode, lid*> ← <*lm, caller*>; return *recentlist* operation *set_reconstruct(disks)*
    if *opmode* ≠ INIT
    then *opmode* ← RECONS; *recons_disks* ← *disks* operation *write(sect)*
    *sector* ← *sect* operation *get_epoch()*
    return *epoch* operation *set_epoch(ep)*
    *epoch* ← *ep* operation *clean_lists()*
    <*recentlist, oldlist*> ← <∅, ∅> operation *need_recovery()*
    if *opmode* = INIT or exists entry in
        *recentlist* ∪ *oldlist* with very old time
    then return YES else return NO
    upon failure of *tid* when *lmode* ∈ {L0, L1} do
    *lmode* ← EXP

FIG. 6C

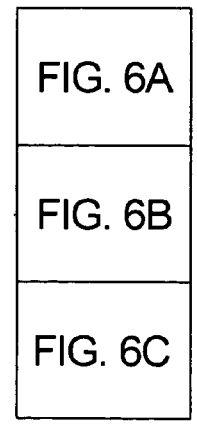

FIG. 6

METHODS OF WRITING AND RECOVERING ERASURE CODED DATA

FIELD OF THE INVENTION

The present invention relates to the field of distributed storage systems. More particularly, the present invention relates to the field of distributed storage systems where redundancy is used to protect against data loss.

BACKGROUND OF THE INVENTION

A critical component of computer systems is data storage. The data storage can be divided conceptually into an individual user's data storage, which is attached to the individual's computer, and network based data storage typically intended for multiple users.

One type of network based storage device is a disk array. The disk array includes a controller coupled to an array of disks. Typically, each of the disks of the disk array is hot swappable, which allows a disk to be replaced without turning off the disk array.

Often the network based storage must meet various performance requirements such as data access speed and data reliability. One way of providing high data access speed is to store data in stripes across multiple disks of the disk array. Each stripe includes multiple data blocks, each of which is stored on a separate disk. When the data is stored or read, each of the disks that holds a data block stores or retrieves the data block associated with it. In this way, the stripe of data is stored or retrieved in about the time it takes to store or retrieve one data block.

One way of providing high reliability is data replication. For the disk array, the data replication stores one or more additional copies of data on one or more separate disks. If one of the disks holding a copy of the data fails, the data is still accessible on at least one other disk. Further, because of the hot swappable feature of the disk array, a failed disk can be replaced without turning off the disk array. Once the failed disk has been replaced, the lost copy of the data can be restored.

Another way of providing the high reliability is erasure coding. Typically for the disk array, the erasure coding encodes one or more redundancy blocks for at least two data blocks stored on the device. Each of the data blocks and the one or more redundancy blocks is stored upon a separate disk of the disk array. If one of the data blocks is lost, it can be retrieved by decoding the lost data block from a redundancy block and the remaining data blocks.

As an alternative to the disk array, researchers have been exploring data storage on an array of independent storage devices which form a distributed storage system. Each of the independent storage devices includes a disk and a network adapter. A potential advantage of the array of independent storage devices includes an ability to locate each of the independent storage devices in separate physical locations. Another potential advantage of the array of independent storage devices is lower cost. The lower cost can result from utilization of commodity components to construct the array of independent storage devices.

What is needed is a method of writing erasure coded data in a distributed storage system.

SUMMARY OF THE INVENTION

According to an embodiment, the present invention comprises a method of writing erasure coded data. In an embodiment, the method begins with a first step of swapping a new data block for an old data block within a stripe of erasure coded data. The stripe of erasure coded data comprises data blocks and a redundancy block. The method continues with a second step of computing a redundancy update parameter for the redundancy block using the new data block and the old data block. The method concludes with a third step of updating the redundancy block using the redundancy block, the redundancy update parameter, and a mathematical operator, thereby forming a new redundancy block.

In another embodiment of the method of writing the erasure coded data, the stripe of erasure coded data comprises the data blocks and redundancy blocks. According to this embodiment, the method instantiates the third step for each of the redundancy blocks.

According to another embodiment, the present invention comprises a method of recovering erasure coded data. In an embodiment, the method of recovering the erasure coded data begins with a first step of obtaining a lock on a subset of data blocks and one or more redundancy blocks. The data blocks and the one or more redundancy blocks comprise a stripe of erasure coded data. In a second step, the method determines whether the subset of the data blocks and the one or more redundancy blocks includes sufficient blocks to restore the stripe of erasure coded data. If the subset of data blocks does not include the sufficient blocks to restore the stripe of erasure coded data, the method relaxes the lock to allow at least one update of the one or more redundancy blocks while not allowing any writes of the data blocks in a third step. The method continues with a fourth step of using the subset of the data blocks and the one or more redundancy blocks to restore the stripe of erasure coded data. The method concludes with a fifth step of releasing the lock.

These and other aspects of the present invention are described in more detail herein.

BRIEF DESCRIPTION OF THE DRAWINGS

The present invention is described with respect to particular exemplary embodiments thereof and reference is accordingly made to the drawings in which:

FIGS. 5A, 5B, and 5C show an embodiment of host computer operations for methods of reading, writing, and recovering erasure coded data of the present invention as pseudo-code; and FIGS. 6A, 6B, and 6C show an embodiment of disk operations for methods of reading, writing, and recovering erasure coded data of the present invention as pseudo-code.

DETAILED DESCRIPTION OF A PREFERRED EMBODIMENT

Figure 1:
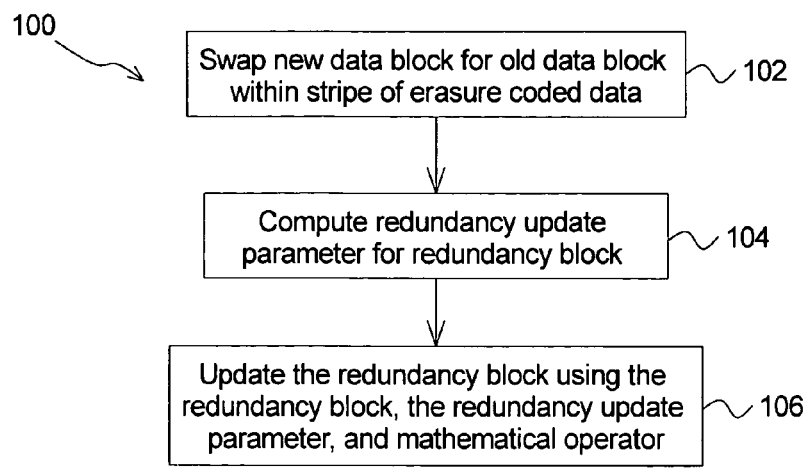
FIG. 1 illustrates an embodiment of a method of writing erasure coded data of the present invention as a flow chart.

An embodiment of a method of writing erasure coded data of the present invention is illustrated as a flow chart in FIG. 1. The method begins with a first step 102 of swapping a new data block for an old data block within a stripe of erasure coded data. The stripe of erasure coded data comprises data blocks and one or more redundancy blocks.

Figure 2:
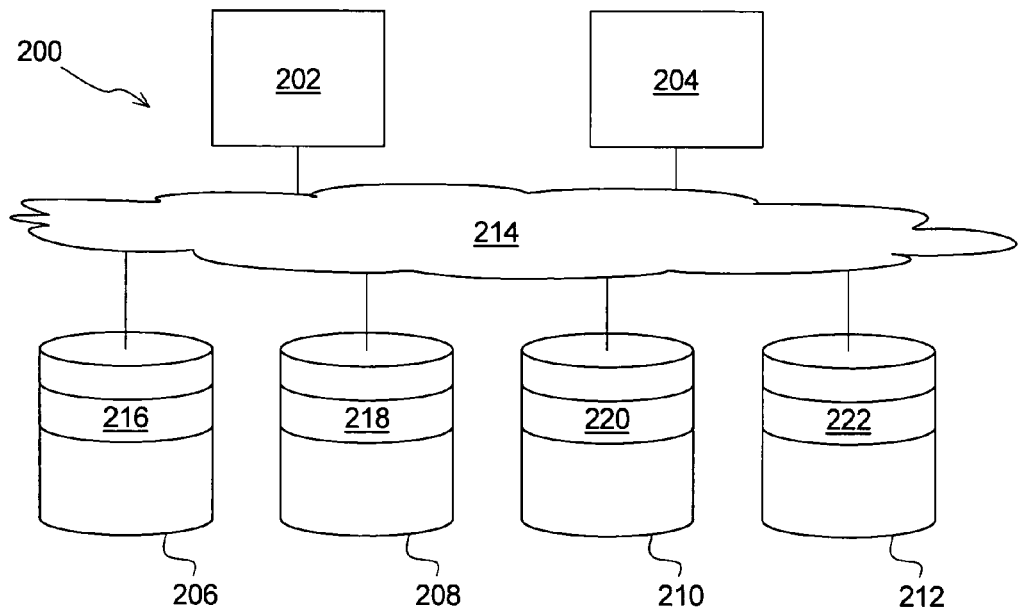
FIG. 2 schematically illustrates an embodiment of a distributed storage system which employs a method of writing erasure coded data of the present invention.

An embodiment of a distributed storage system which employs the method of writing the erasure coded data of the present invention is illustrated schematically in FIG. 2. The distributed storage system 200 comprises first and second host computers, 202 and 204, and first through fourth storage devices, 206 . . . 212, coupled together by a network 214. According to an embodiment, the first and second host computers, 202 and 204, comprise storage servers, which perform read and write operations for clients. The clients access the first and second host computers, 202 and 204, via the network 214 or another network (not shown). According to another embodiment, the first and second host computers, 202 and 204, comprise clients, which perform their own read and write operations. In an embodiment, the first through fourth storage devices, 206 . . . 212, comprise disk devices. In another embodiment, one or more of the first through fourth storage devices, 206 . . . 212, comprise some other type of storage device such as a tape device.

According to an embodiment, the first and second storage devices, 206 and 208, store data blocks in first and second sectors, 216 and 218, respectively, and the third and fourth storage devices, 210 and 212, store redundancy blocks in third and fourth sectors, 220 and 222. Initially, the first through fourth sectors, 216 . . . 222, store a stripe of erasure coded data comprising data blocks "a" and "b." The first sector 216 stores the data block a and the second sector 218 stores the data block b. The third sector 220 stores a first redundancy block, which for example is a sum of the data blocks, a+b. The fourth sector 222 stores a second redundancy block, which for example is a differences of the data blocks, a−b. If any two of the data blocks a and b and the redundancy blocks a+b and a−b are unavailable, the data blocks a and b can be determined from the remaining two blocks.

According to an embodiment, the first host computer 202 employing the method 100 (FIG. 1) issues a swap command to the first storage device 206 (FIG. 2) in the first step 102. The swap command includes a new data block c. The swap command instructs the first storage device 206 to swap the new data block c for the old data block a in the first sector 216 and to return the old data block a to the first host computer 202. In a second step 104, the first host computer 202 computes a first redundancy update parameter for the first redundancy block. For example, the first redundancy update parameter may be a difference of the new data block c and the old data block a, i.e., c−a. The first host computer 202 repeats the second step 104 to determine a second redundancy update parameter, c−a, for the second redundancy block. Alternatively, the first host computer 202 recognizes that the first redundancy update parameter equals the second redundancy parameter and assigns the first redundancy update parameter to the second redundancy update parameter.

In a third step 106 (FIG. 1), the first host computer 202 (FIG. 2) updates the first redundancy block a+b by issuing an update command to the third storage device 210. The update command includes the first redundancy update parameter c−a. According to an embodiment, the update command instructs the third storage device 210 to sum the first redundancy block, a+b, and the first redundancy update parameter, c−a, to form a new first redundancy block, c+b. The update command further instructs the third storage device 210 to replace the redundancy block, a+b, with the new first redundancy block, c+b, in the third sector 220. This updates the first redundancy block so that it has a value of c+b. The first host computer 202 also performs the third step 106 for the second redundancy block by issuing the update command to the fourth storage device 212. This directs the fourth storage device 212 to sum the second redundancy block, a−b, and the second redundancy update parameter, c−a, and to replace the second redundancy block with the sum so that the second redundancy block in the fourth sector 222 has a value of c−b. The update commands can be issued in series (i.e., one after the other) or in parallel (i.e., both at the same time).

According to an embodiment, the second host computer 204 (FIG. 2) employs the method 100 (FIG. 1) to write a new data block d which replaces the old data block b in the second sector 218 of the second storage device 208. In the first step 102, the second host computer 204 issues the swap command to the second storage device 208, which provides the new data block d to the second storage device 208, places the new data block d in the second sector 218, and returns the old data block b. In the second step 104, the second host computer computes a third redundancy update parameter, b−d, for the first redundancy block residing in the third sector 220 of the third storage device 210. In another instantiation of the second step 104, the second host computer 204 computes a fourth redundancy update parameter, d−b, for the second redundancy block residing in the fourth sector 222 of the fourth storage device 212. In the third step 106, the second host computer 204 issues the update command to the third storage device 210, which directs the third storage device 210 to sum the first redundancy block and the third redundancy update parameter, b−d, and to store the result as the first redundancy block in the third sector 220. In another instantiation of the third step 106, the second host computer 204 directs the fourth storage device 212 to sum the second redundancy block and the fourth redundancy update parameter, d−b, and to store the result as the second redundancy block in the fourth sector 222.

Regardless of which of the first and second host computers, 202 and 204, begins its instantiation of the method 100 before the other and regardless of an interleaving of steps of the method 100 by the first and second host computers, 202 and 204, the first through fourth storage devices, 206 . . . 212, hold a consistent stripe of erasure coded data when the first and second host computers, 202 and 204, complete their instantiations of the method 100. When the first and second host computers, 202 and 204, complete the method 100, the first storage device 206 holds the data block c in the first sector 216, the second storage device 208 holds the data block d in the second sector 218, the third storage device 208 holds the first redundancy block, c+d, in the third sector 220, and, the fourth storage device 212 holds the second redundancy block, c−d, in the fourth sector 222.

It will be readily apparent to one skilled in the art that while the erasure coding technique described above employs addition and subtraction other mathematical operators can be used such as an exclusive-or, an addition modulo some constant (such as addition modulo 256), or some other operator. More generally, appropriate mathematical operators for the erasure coding technique fall within a category of a multiplication by a constant followed by addition in which the multiplication and the addition are performed over a field. Such mathematical operators are well known in the general mathematical subject area of commutative algebra and the more specific mathematical subject area of field theory.

According to an embodiment, the method 100 further comprises a step of reading a data block within the stripe of erasure coded data. A host computer reads a data block within a stripe of the erasure coded data by issuing a read command to the storage device which holds the data block. The storage device returns the data block to the host computer.

According to an embodiment, the method 100 employs a recovery procedure if up to two of the first or second data blocks or the first or second redundancy blocks are found to be unavailable during a swap operation or during an update operation or during a read operation. For example, one or two of the first through fourth sectors, 216 . . . 222, may become unavailable. Or for example, one or two of the first through fourth storage devices, 206 . . . 212, may become inoperable. In such a situation, a spare storage device may be used to replace the inoperable device. In general, each storage device will store data blocks or redundancy blocks from many stripes of erasure coded data. The recovery procedure can be used to reconstruct all missing blocks (data blocks or redundancy blocks) from all of the stripes of erasure coded data which were previously stored on the inoperable device. Alternatively, the recovery procedure can be invoked each time a data block or redundancy block is accessed that was previously stored on the inoperable device.

In order to ensure that the recovery procedure restores the stripe of erasure coded data to a consistent state, the swap and add commands employed in the first and third steps, 102 and 106, include a transaction identification. Each of the transaction identifications is unique to the instantiation of the method 100 which uses it. The transaction identifications are initially stored in a recent list on each of the first through fourth storage devices, 206 . . . 212. Occasionally while each of the first and second host computer, 202 and 204, are not performing the method 100, they perform a garbage collection task. A host computer which performs the garbage collection task for the first through fourth sectors, 216 . . . 222, defers writes to the first through fourth sectors, 216 . . . 222, while performing the garbage collection task. The garbage collection task proceeds in two steps. In the first step, the garbage collection task purges a garbage collected list of old transaction identifications for writes which the host computer initiated. In the second step, the garbage collection task moves recent transaction identifications which identify recent writes initiated by the host computer from the recent list to the garbage collected list for each of the first through fourth sectors, 216 . . . 222.

The two step garbage collection task ensures that a failure of the host computer which is performing the garbage collection task does not falsely create inconsistent transaction identifications between the first through fourth sectors, 216 . . . 222. If a transaction identification appears in a garbage collected list for any of the first through fourth sectors, 216 . . . 222, the method 100 of writing the erasure coded data which is identified by the transaction identification completed successfully. This is because a garbage collection task for a transaction identification does not begin while the method 100 is operating. If a transaction identification appears in the recent list or the garbage collected list for the first through fourth sectors, 216 . . . 222, the stripe of erasure coded data is also in a consistent state. If a transaction identification appears in the recent list for at least one of the first through fourth sectors, 216 . . . 222, but does not appear in one or more of the recent lists or garbage collected lists for others of the first through fourth sectors, 212 . . . 222, the stripe of erasure coded data is in an inconsistent state.

If an inoperable device stores a redundancy block, the redundancy block may be restored using the data blocks without looking at the recent list or the garbage collected list. This is because the swap command always completes before an update command which follows it. On the other hand, if a data block is lost, the recent and garbage collected lists must be examined to determine whether a redundancy block that is to be used to restore the data block is in a consistent state.

Figure 3:
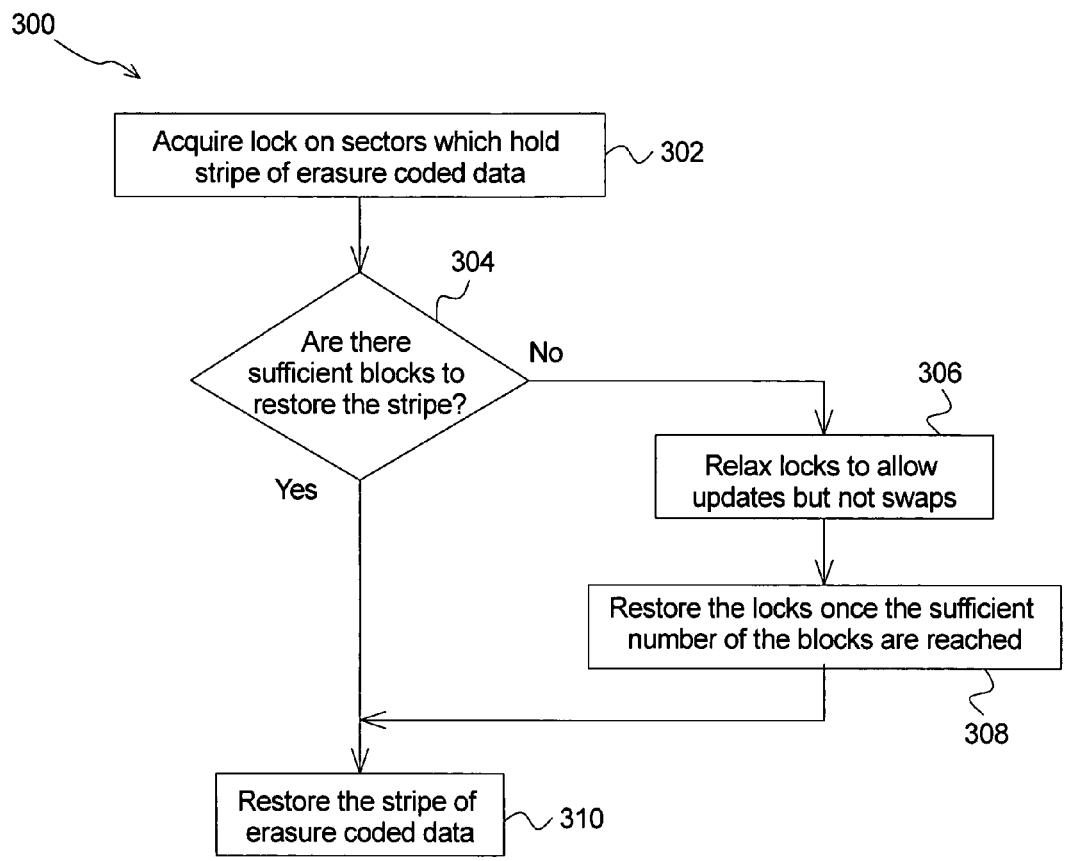
FIG. 3 illustrates an embodiment of a recovery procedure of the present invention as a flow chart.

An embodiment of the recovery procedure 300 of the present invention is illustrated as a flow chart in FIG. 3. The recovery procedure begins with a first step 302 in which a host computer (e.g., the first or second host computer) acquires a lock on each of the first through fourth sectors, 206 . . . 212. The locks prevent other host computers from writing to the stripe of erasure coded data or recovering the stripe of erasure coded data. In the second step 304, the host computer determines whether there are sufficient blocks having consistent state to restore the stripe of erasure coded data. For the stripe of erasure coded data comprising the first and second data blocks and the first and second redundancy blocks, at least two of the blocks must be available. If at least one of theses blocks is a redundancy block, the recent and garbage collected lists must be examined to ensure that the restored stripe of erasure coded data will be in a consistent state as described above.

If there are insufficient blocks to reconstruct, the host computer modifies the locks to relaxed locks in a third step 306. The relaxed locks allow add operations to take place while precluding swap operations and other recovery procedures. Once two of the first and second data blocks and the first and second redundancy blocks reach a consistent state, the host computer restores the lock in a fourth step 308.

In a fifth step 310, the host computer restores the stripe of erasure coded data using two of the blocks (data blocks or redundancy blocks) and stores the stripe erasure coded data across the first through fourth sectors, 216. . . 222. In a sixth step 312, the host computer releases the locks.

If a swap operation takes place before an instantiation of the recovery procedure 300, performing its corresponding update operation after the recovery procedure 300 will make the stripe of erasure coded data inconsistent. To avoid performing the update operation in this situation, an embodiment of the method 100 employs epochs. In the return from a swap command, the first or second storage device, 206 or 208, includes an epoch number for the first or second sectors, 216 and 218, respectively. When the host computer issues the update command to the third and fourth sectors, 220 and 222, it includes the epoch number. Each time a recovery process 300 is employed, the epoch number is incremented. If an epoch number included with an update command does not match the epoch number on the storage device which receives the update command, the update command is rejected. The host computer recognizes that the rejected update command indicates that a recovery procedure has already updated the redundancy block.

If a host computer crashes while performing the recovery procedure 300, the locks will expire after some predetermined time period. In such a situation, a lock mode will indicate to the next host computer that tries to access the stripe of erasure coded data that the locks have expired. In response, the next host computer will begin the recovery procedure 300.

If two host computers both perform the first step 102 of swapping a new data block for an old data block in a single sector, allowing the corresponding third steps 106 of updating the redundancy blocks could cause an improper instantiation of the recovery procedure 300. To ensure that this does not happen, each storage device which receives a swap command includes its previous transaction identification in the return to the host computer. The host computer then includes the previous transaction identification in the update command that it sends to each of the storage devices that store a redundancy block. The storage device checks to see whether the previous transaction identification is in the recent list or the garbage collected list. If it is not, the storage device rejects the update command.

When the host computer receives the rejected update command, the host computer contacts the other host computer which issued the previous transaction identification to see whether the previous transaction identification had been garbage collected from both the recent list and the garbage collected list. If it has been garbage collected from both lists, the host computer resubmits the update command indicating that the previous transaction identification is unavailable. If it has not been garbage collected, the host computer waits for a period of time and then resubmits the update command.

It will be readily apparent to one skilled in the art that, while the discussion above referred to two redundancy blocks, there could be as few as one redundancy block (such as in RAID 4 or 5) or there could be more than two redundancy blocks.

Figure 4:
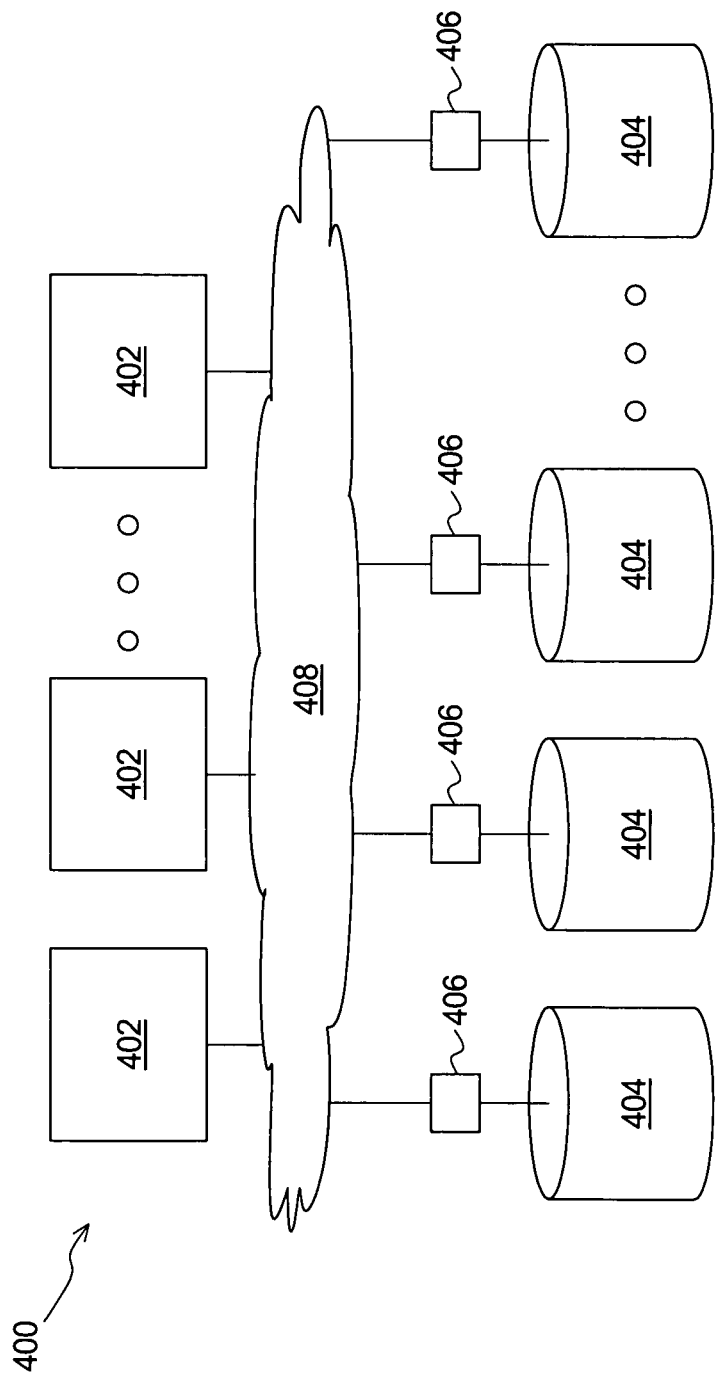
FIG. 4 illustrates an alternative embodiment of a distributed storage system which employs a method of writing erasure coded data of the present invention.

An embodiment of an alternative distributed storage system which employs the method 100 of writing the erasure coded data is illustrated schematically in FIG. 4. The alternative distributed storage system 400 comprises host computers 402, storage devices 404, network adapters 406, and a network 408. The host computers 402 couple to the network 408. The storage devices 404 couple to the network 408 via the network adapters 406. One or more of the network adapters 406 may couple a plurality of the storage devices 404 to the network 408. The host computers 402 may be commodity computers such as PCs. The storage devices may be commodity disk drives. The distributed storage system may include as many as dozens or more of the host computers. The distributed storage systems may include as many as thousands or more of the storage devices 404. In such a storage system, stripes of erasure coded data would include sectors of only a fraction of the storage devices.

An exemplary embodiment of methods of reading, writing, and recovering erasure coded data are provided as pseudo-code in FIGS. 5 and 6. FIG. 5 (FIGS. 5A, 5B, and 5C) provides an embodiment of node operations 500 for host computers (nodes) p. FIG. 6 (FIGS. 6A, 6B, and 6C) provides an embodiment of disk operations 600 for storage devices i. The node operations 500 and the disk operations 600 are for a single stripe of erasure coded data. The pseudo-code can be generalized for multiple stripes of erasure coded data by including a stripe counter.

The stripe of erasure coded data maps k values $v_1, \ldots, v_k$ into n−k redundant values $v_{k+1}, \ldots, v_n$. Any k values selected from the set $\{v_1, \ldots, v_n\}$ can be used to retrieve values $v_1, \ldots, v_k$. The pseudo-code uses a linear erasure code where redundant values $v_{k+1}, \ldots, v_n$ are linear combinations of values $v_1, \ldots, v_k$. Redundant values $v_{k+1}, \ldots, v_n$ are given by:

$$\sum_{i=1}^{k} \alpha_{ji} v_i$$

where $a_{ji}$ is a linear coefficient for the ith value and jth redundant value. Disks $D_i, \ldots, D_k$ store values $v_1, \ldots, v_k$ and redundant disks $D_{k+1}, \ldots, D_n$ store redundant values $v_{k+1}, \ldots, v_n$.

In a node read operation 502 (FIG. 5A), a node p attempts to read value v from disk $D_i$ (line 1). If the value v is available, the node p returns it to a requestor (line 5). If the value v is unavailable ⊥, the node p determines whether a lock mode lmode is unlocked UNL or expired EXP (line 3). If so, the node p begins a recovery operation start_recovery( ) (line 3). If not, the node p tries to read the value v again (line 4).

Meanwhile, a disk read operation 602 (FIG. 6A) performs corresponding disk operations for disk $D_i$.

In a node write operation 504, a node p performs a repeat until a value v and redundant values $v_{k+1}, \ldots, v_n$ have been successfully written (lines 6-27). The write operation 504 begins with the node p issuing a new transaction id ntid (line 7). The node p then issues a swap command to a disk $D_i$ which includes the value v and the new transaction id ntid (line 8). The disk $D_i$ returns an old value sect, an epoch epoch, an old transaction id otid, and a lock mode lmode (line 8). In a while block, the node p computes redundancy update parameters and updates the redundancy values $v_{k+1}, \ldots, v_n$ (lines 14-25). The redundancy update parameters are computed using $a_{ji}$· (v-sect) (line 16). The node p issues update commands to the redundancy disks $D_j$ (line 16). If the old value sect is unavailable ⊥ (line 9) or a problem (i.e., an error condition) is encountered in writing one or more redundancy values (line 18), the node p begins a recovery operation start_recovery( ) (lines 10 and 19). The node write operation 504 employs a "pfor" command, which stands for "parallel for" (lines 53-59), meaning each iteration of the loop can be executed in parallel. The pfor commands can be replaced with "for" commands.

Periodically, a node p garbage collects transaction id's tids which it issued in a garbage collection task 506. The garbage collection task 506 employs a two phase garbage collection in which garbage collected transaction id's tids are purged (lines 28-32) and recent transaction id's tids are garbage collected (lines 33-35).

The recovery operation comprises a series of nested procedures and a function: start_recovery( ) (lines 37 and 38), recover( ) (lines 39-45), recover_solo( ) (lines 46-62), reconstruct(cset), and find_consistent( ). The recovery operation uses two locks. The lock L1 prevents disks from performing swap commands and update commands. The lock L0 prevents disks from performing swap commands but allows update commands. The lock L0 is used to allow one or more write operation to complete their update command in order to reach a consistent state in which k+slack of the disks hold consistent values. The variable slack allows recovery following a node crash which occurs during a recovery operation.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of writing erasure coded data comprising:
   swapping a new data block for an old data block within a stripe of erasure coded data, the stripe of erasure coded data comprising data blocks and a redundancy block, the redundancy block being other than an exclusive-or of all the data blocks, and the stripe of erasure coded data being stored by storage devices in a distributed storage system, wherein the stripe of erasure coded data further comprises a second redundancy block;
   computing a redundancy update parameter for the redundancy block using the new data block and the old data block, said computing being irrespective of the redundancy block;
   after said redundancy update parameter is computed, updating the redundancy block in the distributed storage system using the redundancy block, the redundancy update parameter, and a mathematical operator, thereby forming a new redundancy block; and
   updating the second redundancy block, wherein, during the step of updating the second redundancy block, an error condition is detected and a recovery procedure restores the second redundancy block to a consistent state.

2. The method of claim 1 wherein the recovery procedure comprises:
   obtaining a lock on a subset of blocks;
   using the subset of blocks to reconstruct the second redundancy block;
   writing the second redundancy block; and
   releasing the lock.

3. The method of claim 2 wherein the recovery procedure further comprises incrementing an epoch number for the data blocks, the redundancy block, and the second redundancy block.

4. The method of claim 3 further comprising disregarding an attempt to update the redundancy block or the second redundancy block which includes an update epoch number which does not match the epoch number of the redundancy block or the second redundancy block, respectively.

5. The method of claim 1 wherein the recovery procedure comprises:
   obtaining a lock on a subset of blocks;
   determining that a transaction identification indicates that the redundancy block is awaiting an update following a swap of a second new data block for a second old data block;
   relaxing the lock to allow at least one update of the redundancy block, which brings the redundancy block to a consistent state;
   using an available data block or data blocks and the redundancy block to compute the second redundancy block;
   writing the second redundancy block; and
   releasing the lock.

6. A method of writing erasure coded data comprising:
   swapping a new data block for an old data block within a stripe of erasure coded data, the stripe of erasure coded data comprising data blocks and a redundancy block, the redundancy block being other than an exclusive-or of all the data blocks, and the stripe of erasure coded data being stored by storage devices in a distributed storage system;
   computing a redundancy update parameter for the redundancy block using the new data block and the old data block, said computing being irrespective of the redundancy block; and
   after said redundancy update parameter is computed, updating the redundancy block in the distributed storage system using the redundancy block, the redundancy update parameter, and a mathematical operator, thereby forming a new redundancy block,
   wherein the stripe of erasure coded data further comprises additional redundancy blocks, the method further comprising updating the additional redundancy blocks,
   wherein the step of updating the additional redundancy blocks comprises updating the additional redundancy blocks in series.

7. A method of writing erasure coded data comprising:
   swapping a new data block for an old data block within a stripe of erasure coded data, the stripe of erasure coded data comprising data blocks and a redundancy block, the redundancy block being other than an exclusive-or of all the data blocks, and the stripe of erasure coded data being stored by storage devices in a distributed storage system;
   computing a redundancy update parameter for the redundancy block using the new data block and the old data block, said computing being irrespective of the redundancy block;
   after said redundancy update parameter is computed, updating the redundancy block in the distributed storage system using the redundancy block, the redundancy update parameter, and a mathematical operator, thereby forming a new redundancy block,
   wherein the step of swapping the new data block for the old data block comprises:
       a host computer issuing a swap command to a storage device, the swap command including the new data block; and
       the storage device swapping the new data block for the old data block and returning the old data block to the host computer,
   wherein the host computer performs the step of computing the redundancy update parameter,
   wherein the step of updating the redundancy block comprises:
       the host computer issuing an update command to a second storage device, the update command including the redundancy update parameter;
       the second storage device updating the redundancy block; and
   maintaining a recent list and a garbage collected list of transaction identifications for each of the data blocks and the redundancy block.

8. The method of claim 7 further comprising the host computer purging the garbage collected lists of old transactions identifications conducted by the host computer for each of the data blocks and the redundancy block.

9. The method of claim 8 further comprising the host computer moving recent transactions identifications conducted by the host computer from the recent list to the garbage collected list for each of the data blocks and the redundancy block.

10. A non-transitory computer readable media having stored thereon computer code, which when executed, implements a method of writing erasure coded data, the method of writing the erasure coded data comprising:
    swapping a new data block for an old data block within a stripe of erasure coded data, the stripe of erasure coded data comprising data blocks and a redundancy block, the redundancy block being other than an exclusive-or of all the data blocks, and the stripe of erasure coded data being stored by storage devices in a distributed storage system, wherein the stripe of erasure coded data further comprises a second redundancy block;
    computing a redundancy update parameter for the redundancy block using the new data block and the old data block, said computing being irrespective of the redundancy block;
    after said redundancy update parameter is computed, updating the redundancy block in the distributed storage system using the redundancy block, the redundancy update parameter, and a mathematical operator, thereby forming a new redundancy block; and
    updating the second redundancy block, wherein, during the step of updating the second redundancy block, an error condition is detected and a recovery procedure restores the second redundancy block to a consistent state.

11. The computer readable media of claim 10 wherein the recovery procedure comprises:
    obtaining a lock on a subset of blocks;
    using the subset of blocks to reconstruct the second redundancy block;
    writing the second redundancy block; and
    releasing the lock.

12. The computer readable media of claim 10 wherein the recovery procedure comprises:
- obtaining a lock on a subset of blocks;
- determining that a transaction identification indicates that the redundancy block is awaiting an update following a swap of a second new data block for a second old data block;
- relaxing the lock to allow at least one update of the redundancy block, which brings the redundancy block to a consistent state;
- using an available data block or data blocks and the redundancy block to compute the second redundancy block;
- writing the second redundancy block; and
- releasing the lock.

* * * * *